United States Patent
Kruschwitz

[15] 3,638,359
[45] Feb. 1, 1972

[54] PROTECTIVE SEALING STRIP

[72] Inventor: Werner Kruschwitz, Viersen/Rhineland, Germany

[73] Assignee: Draftex, GmbH, Viersen, Rhineland, Germany

[22] Filed: Mar. 9, 1970

[21] Appl. No.: 17,709

[30] Foreign Application Priority Data

July 24, 1969  Germany.....................P 19 38 223.1

[52] U.S. Cl..............................................49/490, 52/717
[51] Int. Cl.......................................................E06b 7/23
[58] Field of Search..................49/490, 484, 491, 495, 496, 49/497; 52/716–718

[56] References Cited

UNITED STATES PATENTS

| | | | |
|---|---|---|---|
| 3,002,783 | 10/1961 | Hofmeister | 49/490 |
| 3,167,825 | 2/1965 | Zoller | 49/490 |
| 3,363,364 | 1/1968 | Cadiou | 49/490 |
| 3,507,085 | 4/1970 | Kruschwitz | 52/716 |

FOREIGN PATENTS OR APPLICATIONS 851,521  10/1960  Great Britain..........................49/491

*Primary Examiner*—David J. Williamowsky
*Assistant Examiner*—Philip C. Kannan
*Attorney*—Ernest F. Marmorek

[57] ABSTRACT

A U-shaped protective sealing strip adapted to be mounted on a support, especially for sealing doors and trunk lids of automobiles, comprising a sealing profile connected to one leg of the U-shaped sealing strip and having a portion extending about such one leg into the space between such one leg and the other leg of the U-shaped sealing strip, the profile portion being provided with holding ribs for engagement with the support.

6 Claims, 2 Drawing Figures

PATENTED FEB 1 1972  3,638,359

Inventor:
Werner Kruschwitz,

By his Attorney.

3,638,359

PROTECTIVE SEALING STRIP

FIELD OF THE INVENTION

The present invention relates to a protective sealing strip having a U-shaped profile and being adapted to be mounted on a supporting flange.

BACKGROUND OF THE INVENTION

It is known to provide protective sealing strips or decorative strips around the edges of openings or windows, doors, and trunks, especially in automobiles. Such strips are mostly built with a U-shaped profile and are mounted on a supporting flange which extends along the edge of the respective opening. It is furthermore known in this connection to attach to one of the outer surfaces of the sealing strip a special sealing profile, for instance of rubber or the like, by glueing or the like, for purposes of improving the sealing effect.

Experience has shown, however, that even with such strips with an attached sealing profile very often water would pass by the supporting flange and into the space facing away from the sealing profile of the sealing strip and thereby into the interior of the automobile, especially during heavy rain.

SUMMARY OF THE INVENTION

It is, therefore, an object of the present invention to provide a profiled protective sealing strip which can be mounted on a supporting flange, and which will overcome the above-mentioned disadvantages of heretofore known such strips.

It is another object of the present invention to provide a sealing strip of the above-described type which will effectively seal openings, such as windows, doors or trunks of automobiles, even under extreme weather conditions.

In accordance with the present invention, the sealing profile, especially for vehicle doors, and adapted to be mounted on a U-shaped profiled sealing strip is so designed that a portion thereof extends about one longitudinal edge of the sealing strip into the interior of the U-shaped profile thereof and that is is provided with holding ribs resting against the supporting flange.

Preferably, the sealing strip and the sealing profile are so designed that that portion of the sealing profile which extends into the interior of the sealing strip carries at least three holding ribs, at least one of which in unstressed or relaxed condition rests against at least one holding rib each provided on the inner legs of the sealing strip.

Advantageously, the portion of the sealing profile extending into the interior of the sealing strip rests against the inner surface of the U-shaped sealing strip as well as against the lower surface of a holding rib provided at this inner surface. Moreover, this portion is provided, in the vicinity of the longitudinal marginal portion of the sealing strip surrounded thereby, with two holding ribs extending in longitudinal direction thereof and in relaxed condition approximately perpendicularly to the plane of symmetry of the sealing strip.

That portion of the sealing profile which extends into the interior of the sealing strip extends between the edges of the holding ribs provided at the interior leg surfaces of the sealing strip and the crown or apex of the U-shaped profile and is preferably slightly bent or forked.

BRIEF DESCRIPTION OF THE DRAWINGS

The invention will become more readily apparent from the following description of a preferred embodiment thereof shown, by way of example, in the attached drawing, in which.

DETAILED DESCRIPTION OF A PREFERRED EMBODIMENT OF THE INVENTION

Figure 1:
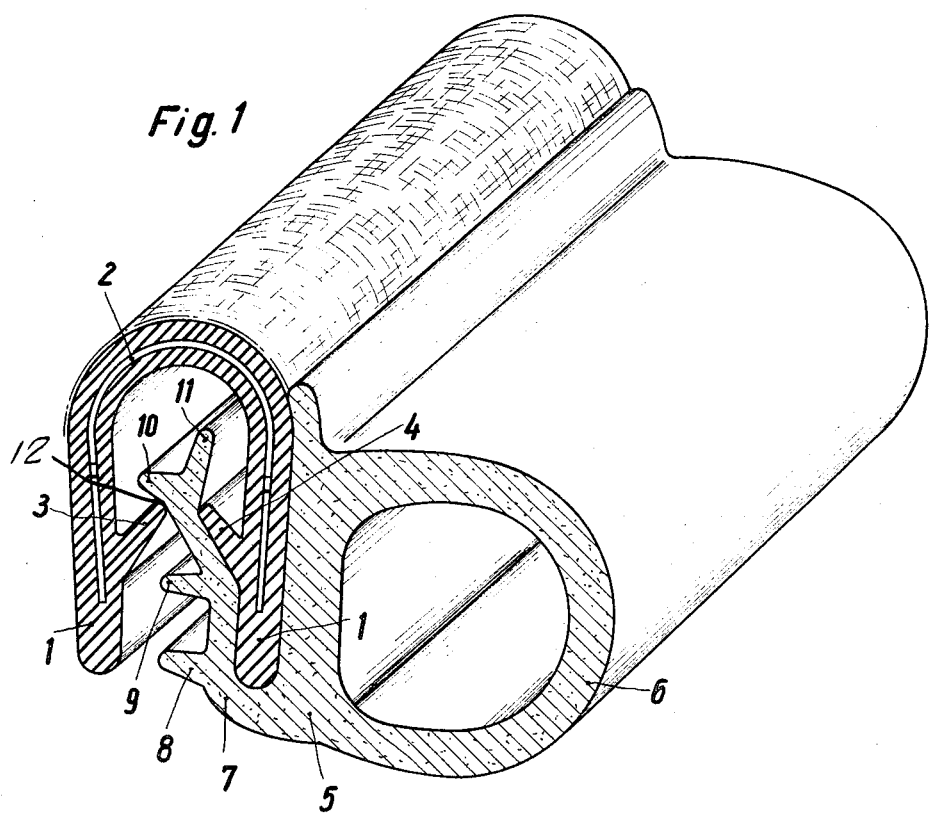
FIG. 1 illustrates in isometric view the entire protective sealing strip in unstressed or relaxed condition, i.e., prior to being mounted on a supporting flange.
Figure 2:
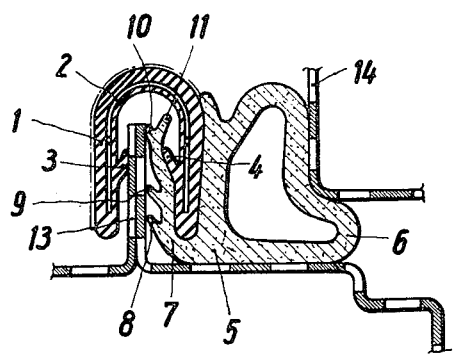
FIG. 2 shows the arrangement according to FIG. 1 upon mounting on a supporting flange.

Referring now to the drawings in detail, the arrangement shown in FIGS. 1 and 2 comprises a U-shaped profiled protective sealing strip 1 intended for a vehicle door. Strip 1 carries, in a manner known per se, a metallic insert 2. The inner surfaces of the legs of the U-shaped profile are provided with two holding or adhering ribs 3 and 4 which extend at an angle and in a direction towards the crown or apex of the U-shaped strip.

A sealing profile 5 is mounted on the outside of the right leg of the sealing strip 1 (as seen in FIGS. 1 and 2) by any convenient means, such as by glue. Sealing profile 5 in turn carries a special extension 6 having a circular tubular profile. Sealing profile 5 may consist of any sufficiently elastic material, such as rubber or a suitable plastic material.

In accordance with the present invention, the sealing profile 5 is so designed that it extends with a portion 7 thereof about the longitudinal edge of the sealing strip 1 into the interior of the latter, and is provided, in addition, with holding ribs 8 to 10 which rest against the supporting flange 13 (see FIG. 2). Ribs 8 and 9 extend from portion 7 of the sealing profile, in unstressed or relaxed condition, approximately perpendicularly to the plane of symmetry of the U-shaped sealing strip, whereas rib 10 extending further into the interior of the sealing strip comes to rest against ribs 3 and 4 of the sealing strip. The upper portion of the extension 7 of the sealing profile 5, as seen in the drawing, rests against the holding rib 4 belonging to that leg of the U-shaped sealing strip 1 which carries the profile 5, whereas rib 10 rests against the opposite rib 3 of the sealing strip 1. The marginal portion or end of rib 3 extends into a groove 12 provided at the juncture of rib 10 with extension 7. Finally, the upper end of the portion 7 of the sealing profile 5 is designated with the reference numeral 11 and is forked. The forked ends are of different length, the longer end being directed toward the leg carrying the profile 5.

FIG. 2 illustrates the position of all parts of sealing strip 1 and sealing profile 5 when the entire strip is mounted on a supporting flange 13. Portion 7 of the sealing profile 5 firmly rests with its ribs 8, 9 and 10 against supporting flange 13 while the sealing pressure is still increased by the holding or adhesive rib 4 of the sealing strip 1. FIG. 2 shows the marginal portion of a vehicle door designated with the reference numeral 14. Of course, this marginal portion can also represent a window or the opening of a trunk. The tubular portion 6 of the sealing profile 5 rests against this marginal portion 14 while being deformed accordingly. Dirt or rainwater is prevented from penetrating from the outside into the interior of the automobile at three places: first, at the point of contact between the sealing profile extension 6 and the marginal portion 14; secondly, at the contacting surface between the sealing profile extension 6 and the lower extension of the supporting flange 13; and thirdly, in an extremely effective manner, at the points of contact of the holding ribs 8, 9 and 10 of portion 7 of the sealing profile 5 with the supporting flange 13 extending into the interior of the sealing strip 1.

From the above, it is apparent that although the invention has been described hereinbefore with respect to a specific embodiment thereof, it is evident that many modifications and changes may be made without departing from the spirit of the invention. Accordingly, by the appended claims, it is intended to cover all such modifications and changes as fall within the true spirit and scope of this invention.

I claim:

1. A U-shaped protective sealing strip adapted to be mounted on supporting means, especially for sealing doors and trunk lids of automobiles, comprising: a sealing profile connected to one leg of said U-shaped sealing strip and having a portion extending about said one leg into the space between said one leg and the other leg of said U-shaped sealing strip, each leg of said sealing strip having its inner surface provided with at least one holding rib, said profile portion being provided with holding ribs for engagement with said supporting means and having forked ends between the ends of said holding ribs of said sealing strip legs and the apex of said sealing strip.

2. A sealing strip according to claim 1, wherein the forked ends of said profile portion are of different length, the longer end being directed toward said sealing strip.

3. A sealing strip according to claim 1, wherein said U-shaped strip includes an embedded metallic insert.

4. A U-shaped protective sealing strip adapted to be mounted on supporting means, especially for sealing doors and trunk lids of automobiles, comprising: a sealing profile connected to one leg of said U-shaped sealing strip and having a portion extending about said one leg into the space between said one leg and the other leg of said U-shaped sealing strip, said profile portion being provided with holding ribs for engagement with said supporting means, each leg of said sealing strip having its inner surface provided with at least one holding rib, said profile portion including at least three holding ribs, at least one of which resting in relaxed condition against the holding ribs of said sealing strip, said profile portion having forked ends between the ends of said holding ribs of said sealing strip legs and the apex of said sealing strip.

5. A sealing strip according to claim 4, wherein the forked ends of said profile portion are of different length, the longer end being directed toward said one leg of said sealing strip.

6. A sealing strip according to claim 4, which includes a metallic insert embedded into the sealing strip.

* * * * *